(12) United States Patent
Bookbinder et al.

(10) Patent No.: US 8,435,441 B2
(45) Date of Patent: May 7, 2013

(54) COMPOSITIONS FOR APPLYING TO CERAMIC HONEYCOMB BODIES

(75) Inventors: Dana Craig Bookbinder, Corning, NY (US); James Arthur Griffin, Jr., Corning, NY (US); David Lambie Tennent, Campbell, NY (US); Lung-Ming Wu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 163 days.

(21) Appl. No.: 12/179,863

(22) Filed: Jul. 25, 2008

(65) Prior Publication Data

US 2009/0033005 A1    Feb. 5, 2009

Related U.S. Application Data

(60) Provisional application No. 60/962,715, filed on Jul. 31, 2007.

(51) Int. Cl.
*C04B 33/32* (2006.01)
(52) U.S. Cl.
USPC .......................................................... 264/630
(58) Field of Classification Search .................. 264/630, 264/631
See application file for complete search history.

(56) References Cited

U.S. PATENT DOCUMENTS

| | | | |
|---|---|---|---|
| 3,885,977 A | 5/1975 | Lachman et al. | 106/62 |
| 3,943,064 A | 3/1976 | Ballain et al. | 252/455 R |
| 3,963,817 A | 6/1976 | Ballain | 264/56 |
| 4,039,480 A | 8/1977 | Watson et al. | 252/455 R |
| 4,297,140 A | 10/1981 | Paisley | |
| 4,455,180 A * | 6/1984 | Hillman et al. | 264/631 |
| 4,483,944 A | 11/1984 | Day et al. | 502/439 |
| 4,631,267 A | 12/1986 | Lachman et al. | 502/439 |
| 4,631,268 A | 12/1986 | Lachman et al. | 502/439 |
| 4,631,269 A | 12/1986 | Lachman et al. | 502/439 |
| 4,855,265 A | 8/1989 | Day et al. | 501/128 |
| 4,912,077 A | 3/1990 | Lachman et al. | 502/302 |
| 5,039,644 A | 8/1991 | Lachman et al. | 502/208 |
| 5,124,302 A | 6/1992 | Lachman et al. | 502/213 |
| 5,183,608 A | 2/1993 | Guile | 264/44 |
| 5,225,128 A | 7/1993 | Katsuragawa et al. | 264/79 |

(Continued)

FOREIGN PATENT DOCUMENTS

DE    10 2007 000 475    5/2008
EP    680938 A1 *    11/1995

(Continued)

*Primary Examiner* — Joseph S Del Sole
*Assistant Examiner* — Erin Snelting
(74) *Attorney, Agent, or Firm* — Matthew J. Mason; Joseph M. Homa (57) ABSTRACT

Disclosed are compositions for applying to honeycomb bodies. The compositions can be used as plugging mixtures for forming a ceramic wall flow filter. Alternatively, the compositions can be used to form skin coatings on exterior portions of a honeycomb body. The disclosed compositions include an inorganic powder batch composition, an organic binder, a liquid vehicle, and a rheology modifier. The compositions exhibit improved rheological properties, including an increased yield strength and reduced viscosity under shear, which, among various embodiments, can enable the manufacture of sintered phase end plugs having reduced levels of dimple and pinhole formations in the final dried and fired end plugs as well as end plugs having relatively uniform and desired depths. Also disclosed are methods for forming end plugged ceramic wall flow filters from the plugging mixtures disclosed herein.

17 Claims, 4 Drawing Sheets

U.S. PATENT DOCUMENTS

| | | | |
|---|---|---|---|
| 5,248,643 A | 9/1993 | Patil et al. | 502/67 |
| 5,258,150 A | 11/1993 | Merkel et al. | 264/66 |
| 5,290,739 A | 3/1994 | Hickman | 501/128 |
| RE34,804 E | 12/1994 | Lachman et al. | 502/64 |
| RE34,853 E | 2/1995 | DeAngelis et al. | 502/439 |
| 5,417,947 A | 5/1995 | Hertl et al. | 423/212 |
| 5,506,179 A * | 4/1996 | Morishita et al. | 501/9 |
| 5,633,217 A | 5/1997 | Lynn | 502/439 |
| 6,113,829 A * | 9/2000 | Bookbinder et al. | 264/211.11 |
| 6,210,626 B1 | 4/2001 | Cornelius et al. | 264/631 |
| 6,238,618 B1 | 5/2001 | Brundage et al. | 264/638 |
| 6,254,822 B1 | 7/2001 | Brundage | 264/638 |
| 6,287,510 B1 * | 9/2001 | Xun | 264/630 |
| 6,319,870 B1 | 11/2001 | Beall et al. | 501/119 |
| 6,368,992 B1 | 4/2002 | Beall et al. | 501/94 |
| 6,432,856 B1 | 8/2002 | Beall et al. | 501/118 |
| 6,620,751 B1 | 9/2003 | Ogunwumi | 501/134 |
| 6,673,300 B2 | 1/2004 | Allen et al. | 264/400 |
| 6,773,657 B2 | 8/2004 | Beall et al. | 264/628 |
| 6,809,139 B2 * | 10/2004 | Fabian et al. | 524/430 |
| 6,849,181 B2 | 2/2005 | Ogunwumi et al. | 210/510.1 |
| 6,864,198 B2 | 3/2005 | Merkel | 501/80 |
| 6,942,713 B2 | 9/2005 | Ogunwumi et al. | 55/523 |
| RE38,888 E | 11/2005 | Beall et al. | 501/119 |
| 2004/0020846 A1 | 2/2004 | Ogunwumi et al. | 210/510.1 |
| 2004/0029707 A1 | 2/2004 | Beall et al. | 501/119 |
| 2004/0092381 A1 | 5/2004 | Beall et al. | 501/134 |
| 2004/0131772 A1 | 7/2004 | Yamada et al. | |
| 2004/0261384 A1 | 12/2004 | Merkel et al. | 55/523 |
| 2005/0153099 A1 * | 7/2005 | Yamada | 428/117 |
| 2006/0029769 A1 * | 2/2006 | Ichikawa et al. | 428/116 |
| 2006/0105139 A1 * | 5/2006 | Suwabe et al. | 428/116 |
| 2006/0263574 A1 * | 11/2006 | Tsunekawa et al. | 428/116 |
| 2007/0039298 A1 | 2/2007 | Tokumaru | 55/523 |
| 2007/0066731 A1 * | 3/2007 | Tattum et al. | 524/311 |
| 2007/0182072 A1 | 8/2007 | Ichikawa et al. | 264/630 |
| 2007/0262497 A1 | 11/2007 | Yamamura et al. | 264/630 |
| 2008/0017034 A1 * | 1/2008 | Becue et al. | 95/285 |

FOREIGN PATENT DOCUMENTS

| | | |
|---|---|---|
| WO | 02/081054 | 10/2002 |
| WO | WO2004/011386 | 2/2004 |
| WO | WO2005/046840 | 5/2005 |
| WO | WO2006/015240 | 2/2006 |

* cited by examiner

COMPOSITIONS FOR APPLYING TO CERAMIC HONEYCOMB BODIES

RELATED APPLICATIONS

This application claims the benefit of U.S. Provisional Application No. 60/962,715, filed Jul. 31, 2007, entitled "Compositions for Applying to Ceramic Honeycomb Bodies."

BACKGROUND

The present invention relates to the manufacture of porous ceramic particulate filters, and more particularly to improved plugging mixtures and processes for sealing selected channels of porous ceramic honeycombs to form wall-flow ceramic filters.

TECHNICAL BACKGROUND

Ceramic wall flow filters are finding widening use for the removal of particulate pollutants from diesel or other combustion engine exhaust streams. A number of different approaches for manufacturing such filters from channeled honeycomb structures formed of porous ceramics are known. The most widespread approach is to position plugs of sealing material at the ends of alternate channels of such structures which can block direct fluid flow through the channels and force the fluid stream through the porous channel walls of the honeycombs before exiting the filter. The particulate filters used in diesel engine applications are formed from inorganic materials, chosen to provide excellent thermal shock resistance, low engine back-pressure, and acceptable durability in use. The most common filter compositions are based on silicon carbide, aluminum titanate, mullite and cordierite. Filter geometries are designed to minimize engine back-pressure and maximize filtration surface area per unit volume.

Diesel particulate filters can consist of a parallel array of channels with every other channel on each face sealed in a checkered pattern such that exhaust gases from the engine would have to pass through the walls of the channels in order to exit the filter. Filters of this configuration are formed by extruding a matrix that makes up the array of parallel channels and then sealing or "plugging" every other channel with a sealant in a secondary processing step. Current aluminum-titanate (AT) and cordierite plugging mixtures have resulted in the formation of large pin holes and dimples during the drying step. On occasion, these can extended over the entire length of the plug and cause the part to be rejected by quality control procedures. Dimpling (which can lead to leaks) has also been a known problem and is made worse with high porosity ceramics such as AT and cordierite substrates.

During the plugging process, the preformed slug of plugging mixture, which is fed into the substrate part (from the ram to the interface between the slug and the substrate) can run or slump in the reservoir of the piston/cylinder, resulting in non-uniform plugging and in some cases, unplugged areas of the substrate, as well as difficulties in manufacturing and yields. Additionally, current plugging mixture formulations have a pot life which is short due to changes in viscosity over time.

Accordingly, there is a need in the art for improved plugging mixtures for forming ceramic wall flow filters. In particular, there is a need for plugging mixtures that do not result in the formation of pin holes, dimples or large internal voids. There also is a need for plugging mixtures having the rheological properties sufficient to hold their shape while in the form of a preform slug yet that can also flow properly during pressing of the mixture into the substrate.

SUMMARY

The present invention provides improved compositions for applying to honeycomb bodies. In one embodiment, the composition can be used for forming skin coatings on exterior portions of honeycomb bodies. In another embodiment, the compositions can be use as plugging mixtures for forming ceramic wall flow filters. The plugging mixtures comprise one or more rheology modifiers which, when added to the mixture formulation, provide high yield strength and low viscosity under shear. Resulting from the improved Theological properties, the plugging mixtures exhibit improved performance with respect to plugging depth, and a reduction or even elimination of the formation of dimples, pinholes or large internal voids that are significantly larger than the desired pore size in the dried or fired plugs. For example, a large internal voids has a largest length dimension of greater than or equal to 0.5 mm.

In one embodiment, the present invention provides a composition comprising an inorganic powder batch composition; an organic binder; a liquid vehicle; and a rheology modifier. The plugging mixture can exhibit a capillary viscosity less than 8000 Pa·s when measured at a shear rate of 10/sec and can exhibit an inclined plane flow rate less than 60 mm/8 min when measured at an angle of 60 degrees.

In another embodiment, the present invention provides a porous ceramic wall flow filter, comprising a honeycomb substrate defining a plurality of cell channels bounded by porous channel walls that extend longitudinally from an upstream inlet end to a downstream outlet end. A first portion of the plurality of cell channels comprise an end plug sealed to the respective channel walls at the downstream outlet end to form inlet cell channels and a second portion of the plurality of cell channels comprise an end plug sealed to the respective channel walls at the upstream inlet end to form outlet cell channels. According to this embodiment, the end plugs are formed from a plugging mixture of the present invention, comprising a ceramic forming inorganic powder batch composition; an organic binder; a liquid vehicle; and a rheology modifier.

In still another embodiment, the present invention provides a method for manufacturing a porous ceramic wall flow filter. The method generally comprises providing a honeycomb body defining a plurality of cell channels bounded by porous channel walls that extend longitudinally from an upstream inlet end to a downstream outlet end. An end portion of at least one predetermined channel is selectively plugged with a plugging mixture of the present invention, comprised of a ceramic forming inorganic powder batch composition; an organic binder; a liquid vehicle; and a rheology modifier. The selectively plugged honeycomb body can then be dried and fired under conditions effective to form a sintered phase ceramic plug in the at least one selectively plugged channel. In yet another embodiment, the compositions can be applied to one or more exterior portions of a honeycomb body as an artificial skin, i.e. a layer or coating, such as an artificial skin applied to the circumferential outer periphery of a honeycomb body, wherein the coated honeycomb body is, for example, a wall flow filter or a substrate.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

DETAILED DESCRIPTION

Those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "rheology modifier" includes embodiments having two or more such rheology modifiers unless the context clearly indicates otherwise.

As used herein, a "wt. %" or "weight percent" or "percent by weight" of an inorganic component, unless specifically stated to the contrary, is based on the total weight of the inorganic powder batch composition in which the component is included.

As used herein, a "superaddition" refers to a weight percent of a component, such as for example, an organic binder, liquid vehicle, or pore former, based upon and relative to 100 weight percent of the ceramic forming inorganic powder batch component.

As used herein, the term "optional" or "optionally" means that the subsequently described event or circumstance may or may not occur, and that the description includes instances where said event or circumstance occurs and instances where it does not.

As briefly summarized above, the present invention provides compositions suitable for applying to honeycomb bodies. In one embodiment, the compositions are suitable for use as plugging mixtures for forming ceramic wall flow filters. In another embodiment, the compositions are suitable for applying as an artificial skin coating on one or more exterior portions of a honeycomb body. Among several advantages, the compositions exhibit increased yield strengths. When used as a plugging mixture, this increased yield strength can result in reduced levels of undesired slumping or dimpling during the drying and firing process. Further, the inventive compositions also exhibit reduced viscosities under shear compared to the viscosities of conventional compositions. When used as a plugging mixture, this reduction in the viscosity under shear can also lead to an improved ability to control the depth of a desired plug within a channel.

The inventive compositions are generally comprised of an inorganic powder batch composition; an organic binder; a liquid vehicle; and a rheology modifier. As used herein, a rheology modifier refers to a plugging mixture component that is capable of altering one or more rheological properties of a plugging mixture, including for example the viscosity and yield strength of a plugging mixture, without adversely affecting the performance properties of the plugging mixture. According to one embodiment of the present invention, the rheology modifier can be non-ionic surfactant. Exemplary classes of non-ionic surfactants that can be used as rheology modifiers include polyethylene glycols; modified polyethylene glycols such as for example polyethylene glycol-oleates, poyetheylene glycol dioleates, alkyl modified polyethylene glycol; polypropylene glycol, modified polypropylene glycols; glycerol; alkyl sorbitols; fatty alcohols; and copolymers of modified or unmodified polyethylene glycols and modified or unmodified polypropylene glycols. Specific examples of commercially available non-ionic surfactants that can be used include polyethylene glycol dioleate, polyoxyethylene (2) oleyl ether, sorbitan monolaurate, glycerol mono-oleate, and oleyl alcohol. Additional commercially available non-ionic surfactants can be found in McCutcheon's Emulsifiers and Detergents, North American edition, The Manufacturing Confectioner Publishing Co., Glen Rock, N.J., 1995.

In an alternative embodiment, the rheology modifier can be an oil, such as for example a natural or synthetic oil. Specific examples of commercially available oils suitable for use a rheology modifier in the plugging mixtures of the present invention include peanut oil, soybean oil, vegetable oil, and synthetic mono- and poly-esters such as alkyl (butyl, hexyl, octyl, decyl, dodecyl, etc.) oleates, adipates, azelates, sebacates, dodecanedioates, phthalates, dimerates, neopentylglycol, trimethyol propane, pentaerythitol (C3 thru C20 acid esters, e.g., proprionate, octonate, 2-ethylhexanoate, oleate, etc.), mixtures thereof and the like; poly-alpha olefin liquids, poly-internal olefin liquids and poly butene liquids; mineral oils; silicone oils. Lists of various commercially available natural and synthetic oils and can be found in Rudnick, L. S., Shubkin, R. L. (1999), Synthetic Lubricants and High-Performance Functional Fluids, 2nd ed., Marcel and Dekker, NY, ISBN 0-8247-0194-1. In still another embodiment, a suitable rheology modifier for use in the plugging mixtures of the present invention is fumed silica.

In some embodiments, the rheology modifier is present as a super addition, and in an amount in the range of from approximately 0.1 weight percent to approximately 15 weight percent, preferably in the range of from approximately 0.1 weight percent to approximately 10 weight percent, of the inorganic powder batch composition, including exemplary amounts of 1.0 weight %, 2.0, weight % 3.0 weight %, 4.0 weight %, 5.0 weight %, 6.0 weight %, 7.0 weight %, 8.0 weight %, and 9.0 weight %, and an amount in any range derived from these values. For example, in another embodiment it is desirable for the rheology modifier to be present as a super addition in an amount in the range of from 4.0 weight percent to 8.0 weight percent of the inorganic powder batch composition. In some embodiments, the rheology modifier is fumed silica and is present as a super addition in an amount in the range of 0.1 weight percent to 2 weight percent of the inorganic powder batch composition. In other embodiments, the rheology modifier is an organic rheology modifier, such as oil or non-ionic surfactant, and is present as a super addition in an amount greater than 2 weight percent of the inorganic powder batch composition.

The inorganic powder batch composition can be comprised of a combination of inorganic batch components sufficient to form a desired sintered phase ceramic composition, including for example a predominant sintered phase composition comprised of ceramic, glass-ceramic, glass, and combinations thereof. It should be understood that, as used herein, combinations of glass, ceramic, and/or glass-ceramic compositions includes both physical and/or chemical combinations, e.g., mixtures or composites. To this end, exemplary and non-limiting inorganic powder materials suitable for use in these inorganic ceramic powder batch mixtures can include cordierite, aluminum titanate, mullite, clay, kaolin, magnesium oxide sources, talc, zircon, zirconia, spinel, alumina forming sources, including aluminas and their precursors, silica forming sources, including silicas and their precursors, silicates, aluminates, lithium aluminosilicates, alumina silica, feldspar, titania, fused silica, nitrides, carbides, borides, e.g., silicon carbide, silicon nitride or mixtures of these.

For example, in one embodiment, the inorganic powder batch composition can comprise a mixture of aluminum-titanate forming components that can be heated under conditions effective to provide a sintered phase aluminum titanate composition. In accordance with this embodiment, the inorganic powder batch composition can comprise powdered raw materials, including an alumina source, a silica source, and a titania source. These inorganic powdered raw materials can for example be selected in amounts suitable to provided a sintered phase aluminum titanate ceramic composition comprising, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos.: WO 2006/015240; WO 2005/046840; and WO 2004/011386. The entire disclosures of the aforementioned references are hereby incorporated by reference.

In an alternative embodiment, the inorganic powder batch composition can comprise a mixture of cordierite forming components that can be heated under conditions effective to provide a sintered phase cordierite composition. According to this embodiment, the ceramic forming inorganic powder batch composition can comprise a magnesium oxide source; an alumina source; and a silica source. For example, and without limitation, the inorganic ceramic powder batch composition can be selected to provide a cordierite composition consisting essentially of from about 49 to about 53 percent by weight $SiO_2$, from about 33 to about 38 percent by weight $Al_2O_3$, and from about 12 to about 16 percent by weight MgO. To this end, an exemplary inorganic cordierite precursor powder batch composition can comprise about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite include those disclosed in U.S. Pat. Nos. 3,885,977; RE 38,888; 6,368,992; 6,319,870; 6,24,437; 6,210,626; 5,183,608; 5,258,150; 6,432,856; 6,773,657; 6,864,198; and U.S. Patent Application Publication Nos.: 2004/0029707; 2004/0261384; the entire disclosures of which are incorporated by reference herein.

Exemplary and non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. The median particle size of the alumina source is preferably greater than 5 μm, including for example, median particle sizes up to 10 μm, 15 μm, 20 μm, or even 25 μm. Commercially available alumina sources can include relatively coarse aluminas, such as the Alcan C-700 series, having a particle size of about 4-6 microns, and a specific surface area of about 0.5-1 $m^2/g$, e.g., C-701™ and relatively fine aluminas having a particle size of about 0.5-2 microns, and a specific surface area of about 8-11 $m^2/g$, such as A-16SG available from Alcoa.

If desired, the alumina source can comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one embodiment, a dispersible alumina source can be a relatively high surface area alumina source having a specific surface area of at least 20 $m^2/g$. Alternatively, a dispersible alumina source can have a specific surface area of at least 50 $m^2/g$. In an exemplary embodiment, a suitable dispersible alumina source for use in the methods of the instant invention comprises alpha aluminum oxide hydroxide ($AlOOH.H_2O$) commonly referred to as boehmite, pseudoboehmite, and as aluminum monohydrate. In another exemplary embodiment, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the present invention include, without limitation, Dispal Boehmite, commercially available from CONDEA Vista Company of Houston, Tex., and Alpha Alumina A1000, commercially available from Almatis, Inc.

Suitable silica sources can in one embodiment comprise clay or mixtures, such as for example, raw kaolin, calcined kaolin, and/or mixtures thereof. Exemplary and non-limiting clays include non-delaminated kaolinite raw clay, having a particle size of about 7-9 microns, and a surface area of about 5-7 $m^2/g$, such as Hydrite MP™, those having a particle size of about 2-5 microns, and a surface area of 10-14 $m^2/g$, such as Hydrite PX™ and K-10 raw clay, delaminated kaolinite having a particle size of about 1-3 microns, and a surface area of about 13-17 $m^2/g$, such as KAOPAQUE-10™, calcined clay, having a particle size of about 1-3 microns, and a surface area of about 6-8 m²/g, such as Glomax LL. All of the above named materials are available from Dry Branch Kaolin, Dry Branch, Ga.

In a further embodiment, it should also be understood that the silica forming source can further comprise crystalline silica such as quartz or cristobalite, non-crystalline silica such as fused silica or sol-gel silica, silicone resin, zeolite, and diatomaceous silica. To this end, a commercially available quartz silica forming source includes, without limitation, Imsil A25 Silica available from Laguna Clay Co. of Byesville, Ohio. In still another embodiment, the silica forming source can comprise a compound that forms free silica when heated, such as for example, silicic acid or a silicon organometallic compound.

The titania source is preferably selected from, but not limited to, the group consisting of rutile and anatase titania. In one embodiment, optimization of the median particle size of the titania source can be used to avoid entrapment of unreacted oxide by the rapidly growing nuclei in the sintered ceramic body. Accordingly, in one embodiment, the median particle size of the titania is up to 20 microns.

Exemplary and non-limiting magnesium oxide sources can include talc. In a further embodiment, suitable talcs can comprise talc having a mean particle size of at least about 5 μm, at least about 8 μm, at least about 12 μm, or even at least about 15 μm. Particle size is measured by a particle size distribution (PSD) technique, preferably by a Sedigraph by Micrometrics. In some embodiments, talc has particle sizes between 15 and 25 μm. In still a further embodiment, the talc can be a platy talc. As used herein, a platy talc refers to talc that exhibits a platelet particle morphology, i.e., particles having two long dimensions and one short dimension, or, for example, a length and width of the platelet that is much larger than its thickness. In one embodiment, the talc possesses a morphology index (MI) of greater than about 0.50, 0.60, 0.70, or 80. To this end, the morphology index, as disclosed in U.S. Pat. No. 5,141, 686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection. To that end, examples of commercially available magnesium oxide sources suitable for use in the present invention include, without limitation, Mistron 002 and F-Cor (100 mesh), available from Luzenac, Inc. of Oakville, Ontario, Canada, and 96-67 Talc available from Barrett's Minerals, Inc. of Dillon, Mont.

In another embodiment, the inorganic powder batch composition comprises powders of one or more already fired, i.e., ceramed, inorganic refractory ceramic compositions. Exemplary ceramed inorganic refractory compositions suitable for use in the inorganic powder batch composition include silicon carbide, silicon nitride, aluminum titanate, mullite, calcium aluminate, and cordierite. In one embodiment, the inorganic powder batch composition comprises a fired cordierite composition. Suitable ceramed cordierite compositions for use in the inorganic powder batch can be obtained commercially from known sources, including for example, Corning Incorporated, Corning, N.Y., USA. Alternatively, a suitable cordierite composition can also be manufactured by heating a cordierite forming batch composition, as described above, under conditions effective to convert the batch composition into a sintered phase cordierite. In one embodiment, a suitable ceramed cordierite consists essentially of from about 49 to about 53 percent by weight $SiO_2$, from about 33 to about 38 percent by weight $Al_2O_3$, and from about 12 to about 16 percent by weight MgO.

Powdered cordierite preferably has a median particle size $d_{50}$ in the range of from about 10 μm to about 45 μm. In another embodiment, the powdered cordierite component can comprise a blend of two or more cordierite compositions, each having differing median particle sizes. For example, in one embodiment, the powdered cordierite can comprise a blend of a relatively coarse powdered cordierite and a relatively fine powdered cordierite. As used herein, a relatively coarse cordierite can, for example, be a powdered cordierite having a median particle size in the range of from about 35 μm to about 45 μm. Further, as used herein, a relatively fine powdered cordierite can, for example, be a powdered cordierite having a median particle size in the range of from about 10 μm to about 20 μm. When the powdered cordierite composition is present as a blend of two or more cordierite components having different particles sizes, the inorganic powder batch composition can comprise, for example, from about 40 weight % to about 70% of a relatively coarse powdered cordierite and from about 30 weight % to about 60 weight % of a relatively fine powdered cordierite.

Still further, it should be understood that the inorganic batch composition can further comprise one or more additive components. For example, in one embodiment, the inorganic powder batch composition can comprise an inorganic binder, such as for example, a borosilicate glass. When present in the inorganic powder batch composition, the additive component can, for example, be used in an amount up to and including 25 weight % of the inorganic batch composition, including exemplary amounts as 1 weight %, 5 weight %, 10 weight %, 15 weight %, 20 weight %, and any range of weight percentages derived from these values.

To provide the compositions of the present invention, the inorganic ceramic powder batch composition, comprising the aforementioned powdered ceramic materials and any optional inorganic additive components, can be mixed together with the rheology modifier, a binder, and a liquid vehicle.

The binder component can include organic binders, inorganic binders, or a combination of both. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Preferably, the organic binder can be present in the composition as a super addition in an amount in the range of from 0.1 weight percent to 5.0 weight percent of the inorganic powder batch composition, and more preferably, in an amount in the range of from 0.5 weight percent to 2.0 weight percent of the inorganic powder batch composition. To this end, the incorporation of the organic binder into the batch composition can further contribute to the cohesion and plasticity of the composition. The improved cohesion and plasticity can, for example, improve the ability to shape the mixture and plugging selected ends of a honeycomb body. Exemplary inorganic binders that can be used include colloidal silica and colloidal alumina.

One liquid vehicle for providing a flowable or paste-like consistency to the inventive compositions is water, although it should be understood that other liquid vehicles exhibiting solvent action with respect to suitable temporary organic binders can be used. The amount of the liquid vehicle component can vary in order to impart optimum handling properties and compatibility with the other components in the ceramic batch mixture. In some embodiments, the liquid vehicle content is present as a super addition in an amount in the range of from 8 to 60%, and in other embodiments in the range of from 8 to 40%, and in other embodiments in the range from 15% to 60%, by weight of the inorganic powder batch composition, and in some embodiments in the range of from 20% to 40% by weight of the inorganic powder batch composition. However, it should also be understood that in another embodiment, it is desirable to minimize the amount of liquid vehicle component while still obtaining a paste like consistency capable of being forced into selected ends of a honeycomb substrate. Minimization of liquid components in the inventive compositions can lead to further reductions in undesired drying shrinkage and crack formation during the drying process.

In addition to the rheology modifier, liquid vehicle and binder, the compositions of the present invention can also comprise one or more optional forming or processing aids. Exemplary processing aids or additives can include lubricants, ionic surfactants, plasticizers, and sintering aids. Exemplary lubricants can include tall oil, or sodium stearate. An exemplary plasticizer for use in the composition can include glycerine. Still further, suitable sintering aids can generally include an oxide source of one or more metals such as strontium, barium, iron, magnesium, zinc, calcium, aluminum, lanthanum, yttrium, titanium, bismuth, or tungsten. In one embodiment, the optional sintering aid comprise a mixture of a strontium oxide source, a calcium oxide source and an iron oxide source. In another embodiment, the optional sintering aid comprise at least one rare earth metal. It should be understood that the sintering aid can be added to the batch composition in a powder and/or a liquid form.

As summarized above, the compositions of the present invention can be used as plugging mixtures to provide end plugged porous ceramic wall flow filters. In particular, these plugging mixtures are well suited for providing end plugged ceramic honeycomb bodies. For example, in one embodiment, an end plugged ceramic wall flow fitter can be formed from a honeycomb substrate that defines a plurality of cell channels bounded by porous channel walls that extend longitudinally from an upstream inlet end to a downstream outlet end. A first portion of the plurality of cell channels can comprise an end plug, formed from a plugging mixture as described herein, and sealed to the respective channel walls at the downstream outlet end to form inlet cell channels. A second portion of the plurality of cell channels can also comprise an end plug, formed from a plugging mixture as described herein, and sealed to the respective channel walls at the upstream inlet end to form outlet cell channels.

Accordingly, the present invention further provides a method for manufacturing a porous ceramic wall flow filter having a ceramic honeycomb body and a plurality of channels bounded by porous ceramic walls, with selected channels each incorporating a plug sealed to the channel wall. The method generally comprises the steps of providing a honeycomb body defining a plurality of cell channels bounded by porous channel walls that extend longitudinally from an upstream inlet end to a downstream outlet end and selectively plugging an end of at least one predetermined channel with a plugging mixture as described herein. The selectively plugged honeycomb body can then be fired under conditions effective to form a sintered phase ceramic plug in the at least one selectively plugged channel.

In one embodiment, the honeycomb substrate to be plugged can be a green substrate. According to this embodiment, if the plugging mixture used to plug the selected cell channels of the green substrate is comprised of a ceramic forming powder batch composition as described herein, the plugging mixture can be fired simultaneously with the green honeycomb substrate in a "single fire" process. In another embodiment, the honeycomb substrate to be plugged can be an already fired or ceramed honeycomb substrate. According to this embodiment, the firing temperature used to fire the end plugs will depend, at least in part, on the composition of the plugging material. For example, if the plugging mixture used to plug the selected cell channels of the ceramed substrate is again comprised of a ceramic forming powder batch composition as described herein, the plugging mixture can be fired for the first time in what is called a "second fire" process. Alternatively, if the plugging mixture used to plug the selected cell channels of the ceramed substrate is comprised of already fired or ceramed inorganic powder batch components, the plugging mixture can be heated at a lower temperature than firing, also referred to as a "cold set" plugging procedure.

Figure 1:
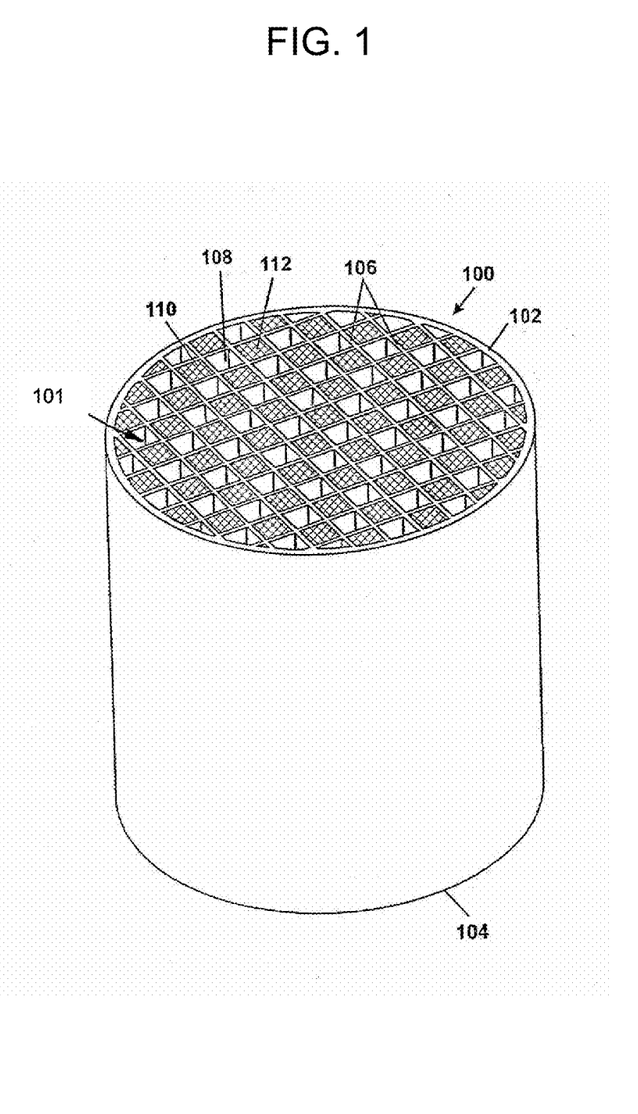
FIG. 1 is a perspective view of an exemplary end plugged wall flow filter according to one embodiment of the present invention.
Figure 2:
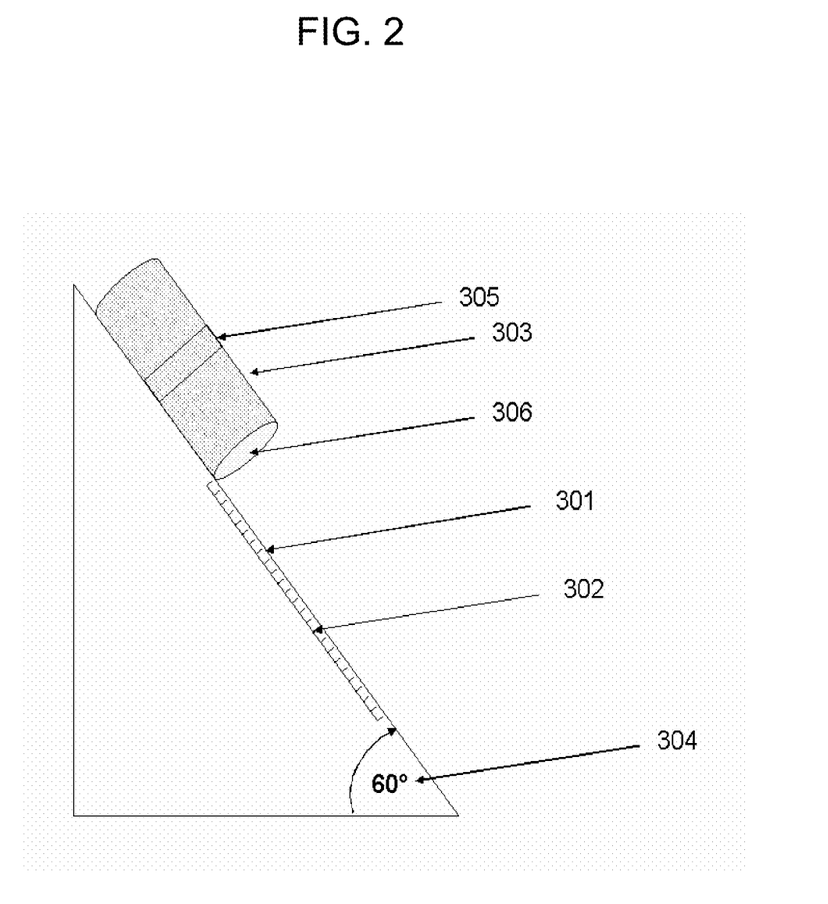
FIG. 2 is a schematic diagram of an inclined plane testing apparatus used to determine incline plane rate of flow according to one embodiment of the present invention.

With reference to FIG. 2, an exemplary end plugged wall flow filter 100 is shown. As illustrated, the wall flow filter 100 has an upstream inlet end 102 and a downstream outlet end 104, and a multiplicity of cells 108 (inlet), 110 (outlet) extending longitudinally from the inlet end to the outlet end. The multiplicity of cells is formed from intersecting porous cell walls 106. A first portion of the plurality of cell channels are plugged with end plugs 112 at the downstream outlet end (not shown) to form inlet cell channels and a second portion of the plurality of cell channels are plugged at the upstream inlet end with end plugs 112 to form outlet cell channels. The exemplified plugging configuration forms alternating inlet and outlet channels such that a fluid stream flowing into the reactor through the open cells at the inlet end 102, then through the porous cell walls 106, and out of the reactor through the open cells at the outlet end 104. The exemplified end plugged cell configuration can be referred to herein as a "wall flow" configuration since the flow paths resulting from alternate channel plugging direct a fluid stream being treated to flow through the porous ceramic cell walls prior to exiting the filter.

The honeycomb substrate can be formed from any conventional material suitable for forming a porous monolithic honeycomb body. For example, in one embodiment, the substrate can be formed from a plasticized ceramic forming composition. Exemplary ceramic forming compositions can include those conventionally known for forming cordierite, aluminum titanate, silicon carbide, aluminum oxide, zirconium oxide, zirconia, magnesium stabilized zirconia, zirconia stabilized alumina, yttrium stabilized zirconia, calcium stabilized zirconia, alumina, magnesium stabilized alumina, calcium stabilized alumina, titania, silica, magnesia, niobia, ceria, vanadia, silicon nitride, or any combination thereof.

The honeycomb substrate can be formed according to any conventional process suitable for forming honeycomb monolith bodies. For example, in one embodiment a plasticized ceramic forming batch composition can be shaped into a green body by any known conventional ceramic forming process, such as, e.g., extrusion, injection molding, slip casting, centrifugal casting, pressure casting, dry pressing, and the like. Preferably, the ceramic precursor batch composition comprises inorganic ceramic forming batch component(s) capable of forming, for example, one or more of the sintered phase ceramic compositions set forth above, a liquid vehicle, a binder, and one or more optional processing aids and additives including, for example, lubricants, and/or a pore former. In an exemplary embodiment, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The formed monolithic honeycomb 100 can have an exemplary cell density of from about 70 cells/in$^2$ (10.9 cells/cm$^2$) to about 400 cells/in$^2$ (62 cells/cm$^2$). Still further, as described above, a portion of the cells 110 at the inlet end 102 are plugged with a paste having the same or similar composition to that of the body 101. The plugging is preferably performed only at the ends of the cells and form plugs 112 having a depth of about 5 to 20 mm, although this can vary. A portion of the cells on the outlet end 104 but not corresponding to those on the inlet end 102 may also be plugged in a similar pattern. Therefore, each cell is preferably plugged only at one end. The preferred arrangement is to therefore have every other cell on a given face plugged as in a checkered pattern as shown in FIG. 1. Further, the inlet and outlet channels can be any desired shape. However, in the exemplified embodiment shown in FIG. 1, the cell channels are square in cross-sectional shape. Once formed, the green body can then be fired to form a sintered phase ceramic composition.

The inorganic batch components can be selected so as to yield a ceramic honeycomb article comprising cordierite, mullite, spinel, aluminum titanate, or a mixture thereof upon firing. For example, and without limitation, in one embodiment, the inorganic batch components can be selected to provide a cordierite composition consisting essentially of, as characterized in an oxide weight percent basis, from about 49 to about 53 percent by weight SiO2, from about 33 to about 38 percent by weight $Al_2O_3$, and from about 12 to about 16 percent by weight MgO. To this end, an exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite include those disclosed in U.S. Pat. Nos. 3,885,977; RE 38,888; 6,368,992; 6,319,870; 6,24,437; 6,210,626; 5,183,608; 5,258,150; 6,432,856; 6,773,657; 6,864,198; and U.S. Patent Application Publication Nos.: 2004/0029707; 2004/0261384.

Alternatively, in another embodiment, the honeycomb body can be formed from inorganic batch components selected to provide, upon firing, a mullite composition consisting essentially of, as characterized in an oxide weight percent basis, from 27 to 30 percent by weight $SiO_2$, and from about 68 to 72 percent by weight $Al_2O_3$. An exemplary inorganic mullite precursor powder batch composition can comprise approximately 76% mullite refractory aggregate; approximately 9.0% fine clay; and approximately 15% alpha alumina. Additional exemplary non-limiting inorganic batch component mixtures suitable for forming mullite include those disclosed in U.S. Pat. Nos. 6,254,822 and 6,238,618.

Still further, the honeycomb body can be formed from inorganic batch components selected to provide, upon firing, an aluminum-titanate composition consisting essentially of, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos.: WO 2006/015240; WO 2005/046840; and WO 2004/011386.

Figure 3:
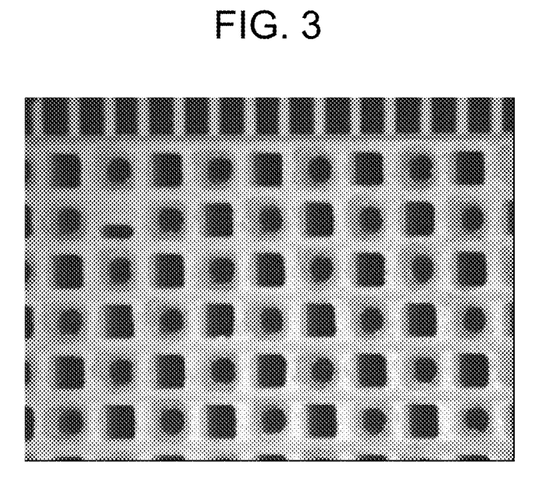
FIG. 3 is a photographic top view image of an aluminum titanate honeycomb substrate end plugged with a plugging mixture without a rheology modifier.

Once the honeycomb substrate is formed, a plugging mixture as described herein can then be forced into selected open cells of either a green honeycomb substrate or an already fired honeycomb substrate in the desired plugging pattern and to the desired depth, by one of several conventionally known plugging process methods. For example, selected channels can be end plugged as shown in FIG. 3 to provide a "wall flow" configuration whereby the flow paths resulting from alternate channel plugging direct a fluid or gas stream entering the upstream inlet end of the exemplified honeycomb substrate, through the porous ceramic cell walls prior to exiting the filter at the downstream outlet end. The plugging can be effectuated by, for example, using a conventional masking apparatus and process such as that disclosed and described in U.S. Pat. No. 6,673,300, the entire disclosure of which is incorporated by reference herein.

The resulting plugged honeycomb body can then be dried, and subsequently fired under conditions effective to convert the plugging mixture into a primary sintered phase ceramic composition. Conditions effective for drying the plugging material functionally include those conditions capable of removing at least substantially all of the liquid vehicle present within the plugging mixture. As used herein, at least substantially all include the removal of at least 95%, at least 98%, at least 99%, or even at least 99.9% of the liquid vehicle present in the plugging mixture. Exemplary and non-limiting drying conditions suitable for removing the liquid vehicle include heating the end plugged honeycomb substrate at a temperature of at least 50° C., at least 60° C., at least 70° C., at least 80° C., at least 90° C., at least 100° C., at least 110° C., at least 120° C., at least 130° C., at least 140° C., or even at least 150° C. for a period of time sufficient to at least substantially remove the liquid vehicle from the plugging mixture. In one embodiment, the conditions effective to at least substantially remove the liquid vehicle comprise heating the plugging mixture at a temperature of at least about 60° C. Further, the heating can be provided by any conventionally known method, including for example, hot air drying, or RF and/or microwave drying.

After drying, the plugging mixtures as described herein can be fired under conditions effective to convert the plugging material into a primary sintered phase ceramic composition. In one embodiment, the step of firing the plugging material can be a "single fire" process as described above. According to this embodiment, the selectively end plugged honeycomb substrate is a green body or unfired honeycomb body comprised of a dried plasticized ceramic forming precursor composition. The conditions effective to fire the plugging mixture are also effective to convert the dried ceramic precursor composition of the green body into a sintered phase ceramic composition. Further according to this embodiment, the unfired honeycomb green body can be selectively plugged with a plugging mixture having a composition that is substantially equivalent to the inorganic composition of the honeycomb green body. Thus, the plugging material can for example comprise either the same raw material sources or alternative raw material sources chosen to at least substantially match the drying and firing shrinkage of the green honeycomb. Exemplary conditions effective to simultaneously single fire the plugging mixture and the green body can comprise firing the selectively plugged honeycomb body at a maximum firing temperature in the range of from 1350° C. to 1500° C., and more preferably at a maximum firing temperature in the range of from 1375° C. to 1425° C.

In an alternative embodiment, the step of firing the plugging material can be a "second fire" process. According to this embodiment, the provided honeycomb substrate has already been fired to provide a ceramic honeycomb body prior to selectively end plugging the honeycomb substrate with the plugging mixture of the present invention. Accordingly, the conditions effective to fire the plugging mixture are those effective to convert the plugging mixture into the ceramic composition. To this end, it can be desirable to selectively plug one or more channels of the honeycomb body with a plugging mixture that will result in a plug with physical properties similar to the honeycomb, but which can be fired without altering the properties of the ceramed honeycomb substrate. For example, a plugging mixture according to this embodiment can be chosen to lower the peak firing temperature required for firing of the plugs to a temperature below the peak firing temperature of the fired ceramic honeycomb body.

The conditions effective to set or cure the plugging mixture in a second heating process will again depend in part on the particular composition of the plugging material. However, effective heating conditions can comprise heating the plugging material at a maximum temperature of, at least 400° C., at least 700° C., at least 800° C., at least 900° C., or even at least 1000° C. Preferably, organic materials are removed from the body as a result of such heating.

In still another embodiment, the compositions of the present invention are also suitable for use in applying an "after applied" or non co-extruded artificial skin or surface coating to an extruded honeycomb body. As one of ordinary skill in the art will appreciate, when honeycomb substrates are formed and dried, the resulting body may need to be resized or shaped in order to comply with desired size and shape tolerances for a given end use application. Accordingly, portions of the outer surface of a formed honeycomb body can optionally be removed by known methods such as sanding, grinding, and the like, in order to obtain a resulting body having a desired shape. After the removal of material from the outer surface of the body, the compositions of the present invention can be applied to the outer periphery in order to form an after applied skin to the honeycomb body and to re-seal any honeycomb substrate channels that may have been exposed or breached due to the removal of material.

EXAMPLES

To further illustrate the principles of the present invention, the following examples are put forth so as to provide those of ordinary skill in the art with a complete disclosure and description of how the plugging mixtures and methods claimed herein are made and evaluated. They are intended to be purely exemplary of the invention and are not intended to limit the scope of what the inventors regard as their invention. Unless indicated otherwise, parts are parts by weight, temperature is ° C. or is at ambient temperature, and pressure is at or near atmospheric.

In the following Examples, a number of plugging mixtures were prepared and evaluated for rheological properties including yield strength, as indicated by a resistance to slumping and deformation, and capillary viscosity. Additionally, the plugging mixtures were also evaluated for their performance properties when used to form end plugs in both cordierite and aluminum titanate honeycomb articles. In particular, the evaluated performance properties included the plugging materials ability to achieve a uniform and desired plugging depth and to provide a dried and fired plug exhibiting little or no dimple formation.

Examples 1-27 were evaluated for the performance of plugging mixtures comprising already fired or ceramed cordierite. A listing of the materials used to prepare the plugging mixtures utilized in Examples 1-27 is set forth in Table 1 below.

TABLE 1

Materials Used

| Component | Product Name | Supplier | Supplier Address | Rheology Modifier Code |
|---|---|---|---|---|
| Methylcellulose | Methocel ® A4M | Dow Chemical | Midland, MI | — |
| Colloidal Silica | Ludox ® HS40 | W. R. Grace | Columbia MD | — |
| Borosilicate Glass (−325 mesh) | Pyrex ® 7761 | Corning, Inc. | Corning, NY | — |
| Powdered cordierite $d_{50}$ 40.4 | Coarse Cordierite | Corning, Inc. | Corning, NY | — |
| Powdered Cordierite $d_{50}$ 14.5 | Fine Cordierite | Corning, Inc. | Corning, NY | — |
| Deionized water | Deionized Water | — | — | — |
| Sorbitan monolaurate | Span ® 20 | Croda, Inc. | Edison NJ | RM-1 |
| Polyoxyethylene (2) oleyl ether | Brij ® 93 | Croda, Inc. | Edison NJ | RM-2 |
| Polyethylene glycol 400 dioleate | PEG 400 DO | BASF | Florham Park NJ | RM-3 |
| Polyethylene glycol 200 dioleate | PEG 200 DO | Stepan, Inc. | Northfield IL. | RM-4 |
| Fumed Silica | Cabosil ® EH5 | Cabot Corp. | Billerica MA | RM-5 |

TABLE 1-continued

Materials Used

| Component | Product Name | Supplier | Supplier Address | Rheology Modifier Code |
|---|---|---|---|---|
| Peanut Oil | Peanut Oil | Wegmans, Inc. | Rochester NY | RM-6 |
| Soybean Oil | Soybean Oil | Cargill, Inc. | Chicago IL | RM-7 |
| Glycerol Monoleate | GMO | Emery | Cincinnati OH | RM-8 |
| Vegetable Oil | Agri-Pure ™ 60 | Cargill, Inc. | Chicago IL | RM-9 |
| Oleyl alcohol | Oleyl Alcohol | Sigma-Aldrich | Milwaukee WI | RM-10 |
| Polyoxyethylene (20) cetyl ether | Brij ® 58 | Croda Inc. | Edison, NJ | RM-11 |
| Polyoxyethylene (4) sorbitan monolaurate | Tween ® 21 | Croda Inc. | Edison, NJ | RM-12 |
| Polyoxyethylene (6) Nonylphenol | Igepal ® CO530 | Rhodia Inc. | Cranbury, NJ | RM-13 |

Examples 28-30 evaluated the performance of plugging mixtures comprised of a cordierite forming ceramic batch composition. In addition to the materials set forth above in Table 1, the formulation for the cordierite forming ceramic batch composition used in Examples 28-30 is set forth in Table 2 below:

TABLE 2

Cordierite Forming Composition

| Component | Product Name | Supplier | Supplier Address | Weight % |
|---|---|---|---|---|
| Talc | F-Cor | Luzenac | Greenwood Village, CO | 35.03 |
| Clay | K-10 | Imerys | Roswell, GA | 13.76 |
| Silica | Cerasil 300 | Unimin Corp. | New Canaan, CT | 10.76 |
| Alumina | A3000 | Almatis GmbH | Frankfurt-am main, Germany | 12.73 |
| Alumina | Micral 6000 (AC714) | Aluchem, Inc. | Reading, OH | 13.76 |
| Graphite | Asbury 4740 | Asbury Carbon | Asbury, NJ | 12.91 |
| Ionic Lubricant | SAN Liga | Peter Greven | Bad Munstereifel, Germany | 0.45 |
| Organic Binder | Methocel BD06 (F240) | Dow Chemical | Midland, MI | 0.60 |

The plugging mixture formulations prepared using the materials from Tables 1 and 2 are set forth in Table 3 below.

TABLE 3

Plugging Mixture Formulations

| Example | Cordierite Forming Composition | Coarse Cordierite (grams) | Fine Cordierite (grams) | Pyrex (grams) | Methocel (grams) | Ludox (grams) | Water (grams) | (Rheology Modifier) grams |
|---|---|---|---|---|---|---|---|---|
| 1 | — | 50 | 30 | 20 | 1 | 25 | 24 | (RM-3) 6 |
| 2 | — | 50 | 30 | 20 | 1 | 25 | 26 | (RM-3) 6 |
| 3 | — | 50 | 30 | 20 | 1 | 25 | 28 | (RM-3) 6 |
| 4 | — | 50 | 30 | 20 | 1 | 25 | 32 | (RM-3) 6 |
| 5 | — | 50 | 30 | 20 | 1 | 25 | 36 | (RM-3) 6 |
| 6 | — | 50 | 30 | 20 | 1 | 25 | 26 | (RM-3) 3 |
| 7 | — | 50 | 30 | 20 | 1 | 25 | 26 | (RM-4) 6 |
| 8 | — | 50 | 30 | 19.5 | 1 | 25 | 26 | (RM-5) 0.5 |
| 9 | — | 50 | 30 | 20 | 1 | 25 | 26 | (RM-1) 6 |
| 10 | — | 50 | 30 | 20 | 1 | 25 | 22 | (RM-2) 6 |
| 11 | — | 50 | 30 | 20 | 1 | 25 | 26 | (RM-2) 6 |
| 12 | — | 50 | 30 | 20 | 1 | 25 | 28 | (RM-2) 6 |
| 13 | — | 50 | 30 | 20 | 1 | 25 | 19 | (RM-7) 6 |
| 14 | — | 50 | 30 | 20 | 1 | 25 | 19 | (RM-6) 6 |
| 15 | — | 50 | 30 | 20 | 1 | — | 40 | (RM-7) 6 |
| 16 | — | 50 | 30 | 20 | 1 | — | 40 | (RM-6) 6 |
| 17 | — | 50 | 30 | 20 | 1 | — | 40 | (RM-8) 6 |
| 18 | — | 50 | 30 | 20 | 1 | — | 40 | (RM-10) 6 |
| 19 | — | 50 | 30 | 20 | 1 | — | 37 | (RM-10) 6 |
| 20 | — | 50 | 30 | 20 | 1 | — | 40 | (RM-2) 6 |
| 21 | — | 50 | 30 | 20 | 1 | — | 38 | (RM-9) 6 |
| 22 | — | 50 | 30 | 20 | 1 | — | 40 | (RM-9) 6 |
| 23 | — | 62.5 | 37.5 | — | 1 | 25 | 20 | (RM-2) 6 |
| 24 | — | 62.5 | 37.5 | — | 1 | 25 | 20 | (RM-9) 6 |

TABLE 3-continued

Plugging Mixture Formulations

| Example | Cordierite Forming Composition | Coarse Cordierite (grams) | Fine Cordierite (grams) | Pyrex (grams) | Methocel (grams) | Ludox (grams) | Water (grams) | (Rheology Modifier) grams |
|---|---|---|---|---|---|---|---|---|
| 25 | — | 62.5 | 37.5 | — | 1 | 25 | 22 | (RM-9) 6 |
| 26 | — | 62.5 | 37.5 | — | 1 | 25 | 26 | (RM-12) 6 |
| 27 | — | 62.5 | 37.5 | — | 1 | 25 | 26 | (RM-13) 6 |
| 28 | 100 | — | — | — | — | — | 31.6 | (RM-11) 6 |
| 29 | 100 | — | — | — | — | — | 31.6 | (RM-13) 6 |
| 30 | 100 | — | — | — | — | 25 | 10.6 | (RM-3) 12 |

To prepare the plugging formulations set forth in Table 3 above, the dry components for each formulation were weighed into a 250 ml plastic container and sealed with a lid. The dry components were then shaken for one minute to ensure good mixing. The liquid components of each formulation were then added and mixed using a metal spatula to provide the resulting plugging mixture. The inclined plane test, capillary viscosity test, and substrate plugging tests required approximate batch sizes of 75 grams, 150 grams, and 225 grams, respectively. Larger batch quantities (e.g., 10 Kg or larger) of these formulations were also made for scale-up to a pilot and manufacturing lines. The rheological tests and plugging of parts was carried out immediately after mixing of the plugging mixtures was complete.

An inclined plane test was developed to evaluate the plugging mixture paste formulation's resistance to deformation and slumping. This is a measurement of a material's ability to maintain shape and not yield as well as also to provide insight for a material to not form dimples. This test used a 60 degree inclined plane to measure the rate of mixture flow. A schematic of the inclined plane test apparatus is shown in FIG. 2. As shown, the test apparatus comprised a clear plastic plate 301 that was formed from Lexan® brand polycarbonate and having a ruler 302 attached to the underside of the plate. The plate was positioned at a 60 degree angle with respect to level. A 32 mm inside diameter by 36 mm outside diameter silica glass tube 303 having a 50 mm length was used as a holding container for the plugging mixture to be tested at the 60 degree angle 304. The tube, which was open at both ends, was fully packed with the plugging mixture to be tested 306 and to that end held approximately 75 grams of mixture paste. To ensure the tube was fully packed and absent of any internal voids, the tube was filled with excess plugging mixture, after which both ends of the tube were scraped flush to remove any excess. The filled tube was held horizontal with the ends blocked by wax paper until it was inserted into a holder 305 attached to the plastic inclined plane plate so that the inside diameter of the tube 303 was even with the surface of the plate. The beginning of flow was defined as and calculated from the time at which the plugging mixture within the tube began touching the surface of the plate 301.

All inclined plane flow experiments were preformed at room temperature of approximately 22-24 degrees Celsius and relative humidity of approximately 50%. Mixture paste formulations were made immediately prior to inclined plane testing. Measurements of the mixture paste flow verses time were recorded over an 8 minute period wherein the test was completed. The results of the inclined plane test for the plugging formulations are set forth in Table 5 below and reported in units of mm flow after 8 minutes. In some cases the inclined plane test was terminated early due to a mixture paste flowing rapidly past the end of the plate 301; this was observed with some ceramic paste formulations without the current inventive rheology modifier additions.

A capillary viscosity test was used to determine and compare the viscosity of the plugging mixtures over the range of shear rates of from 1/s to 50/s. This characterization method was used to determine a material's ability to flow under applied shear, i.e., shear experienced while pumping the mixture paste and plugging a substrate. The capillary viscosity test was conducted using a Rosand RH-7 capillary viscometer (Malvern Instruments Inc. 10 Southville Road, Southborough Mass. 01772). The viscometer had a barrel/plunger diameter of 15 mm, and a sample chamber within the barrel of approximately 250 mm, and utilized a capillary die (Part #DA-1.0-0.25-90-15), having a length of 0.25 mm, a diameter of 1 mm, and entry angle of 90 degrees, and an outside diameter of 15 mm. A 250 psi pressure transducer was used. The plunger speeds with corresponding shear rates is shown below in Table 4.

TABLE 4

| Shear rate (/s) | Speed (mm/min) |
|---|---|
| 1 | 0.03 |
| 1.63 | 0.05 |
| 2.66 | 0.09 |
| 4.34 | 0.14 |
| 7.07 | 0.24 |
| 11.53 | 0.38 |
| 18.8 | 0.63 |
| 30.66 | 1.02 |
| 50 | 1.67 |

The apparent viscosity, without correction, was recorded as a function of shear rate. Based on the typical cell geometry of a honeycomb article to be end plugged, and the typical time required to push the plugging paste into the selected honeycomb cells, it was estimated that the shear rate was approximately 10/s for plugging the honeycomb ceramic substrates used in the following examples. Accordingly, the apparent viscosities of the plugging mixtures of Examples 1 through 24, for a shear rate of 10/s, are reported in Table 5 below.

Following the inclined plane and capillary viscosity tests described above, the plugging mixtures of Examples 1 through 30 were used to plug exemplary aluminum titanate and cordierite honeycomb substrates. The plugged substrates were then evaluated for the plugging depth, existence of dimple formation and the existence of voids or pinhole formation. The Aluminum-Titanate substrates comprised cell geometries of 300 cells per square inch and 13 mil wall thickness. The overall dimension of the aluminum titanate honeycomb bodies were a 4"×7.8"×6.8" oval and had porosity % P of about 50 to 51%. Further, the median pore size of the porosity % P was in the range of from 12 μm to 16 μm.

Similarly, the Cordierite substrates used had cell geometries of 275 cells per square inch with a 15 mil wall thickness. The overall part size was 5.66" diameter×6" length and porosity of approximately 50%.

To plug the honeycomb bodies, a polymer mask with a checkerboard pattern was placed on both ends of the ceramic substrate to be plugged with the mixture paste. The mask had holes which opened to alternating cells on the substrate ends. A roll of 1 inch wide masking tape was used to wrap the end of the substrate thus creating an approximately 5 mm tall dam for the plugging mixture. Plugging mixture formulations were prepared just prior to plugging and placed on the ceramic substrate to the top of the tape dam. This assembly was placed in a hydraulic press (parallel ends pushing on the mixture paste) where it took approximately 5-10 seconds to push the paste into the masked ceramic substrate. As stated above, based on the cell geometry and time to push the plugging paste into the cells, it was estimated that the capillary viscosity shear rate is approximately 10/s for plugging the honeycomb ceramic substrates used in these examples. Following pressing, the polymer mask was removed; the sample was placed in an oven set at 60 degrees Celsius and dried for 6-24 hours. Parts were then cut open to measure the depth the plugging mixture filled the ceramic substrate. Parts were also fired for 1-6 hours at approximately 1000 degrees Celsius.

The results from the inclined plane, capillary viscometer and substrate plugging tests are shown below in Table 5. In some embodiments, it is desirable to obtain plug depths of 5-10 mm to assure that the parts are plugged (and the plugs don't fall out) and that the plug lasts over the lifetime of the honeycomb body, e.g. diesel filter. The inventive plugging mixture pastes comprised of the rheology modifiers, exhibited excellent plugging depths, low capillary viscosity, no dimples or large internal voids after drying or firing, and had excellent slumping resistance.

the inventive plugging mixtures exhibited a capillary viscosity less than 8000 Pa·s when measured at a shear rate of 10/sec. In still further embodiments, certain inventive plugging mixtures also exhibited capillary viscosity less than 6000 Pa·s, less than 4000 Pa·s, and even less than 2000 Pa·s, when measured at a shear rate of 10/sec. Additionally, the inventive plugging mixtures also exhibited an inclined plane flow rate less than 60 mm/8 min when measured at an angle of 60 degrees. In still further embodiments, certain inventive plugging mixtures also exhibited inclined plane flow rates less than 50 mm/8 min, less than 40 mm/8 min, and even less than 30 mm/8 min.

Figure 4:
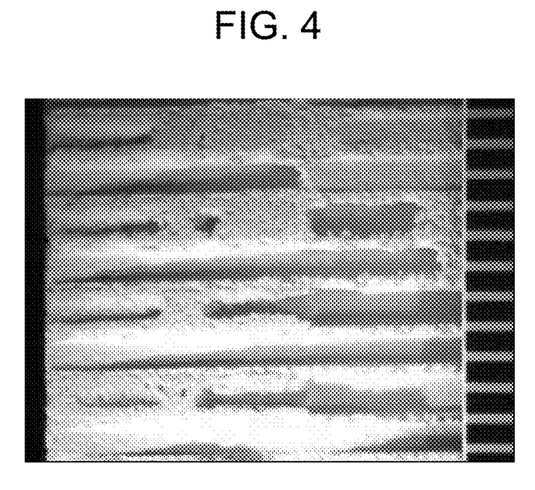
FIG. 4 is a photographic side view image of an aluminum titanate honeycomb substrate end plugged without a rheology modifier.
Figure 5:
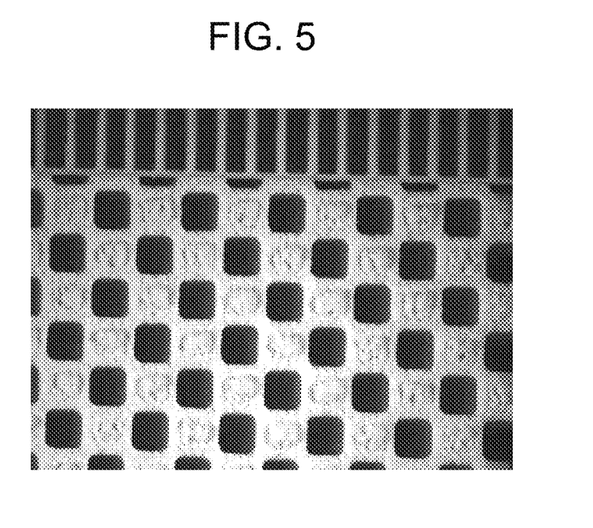
FIG. 5 is a photographic top view image of an aluminum titanate honeycomb substrate end plugged with an inventive plugging mixture according to one embodiment of the present invention.
Figure 6:
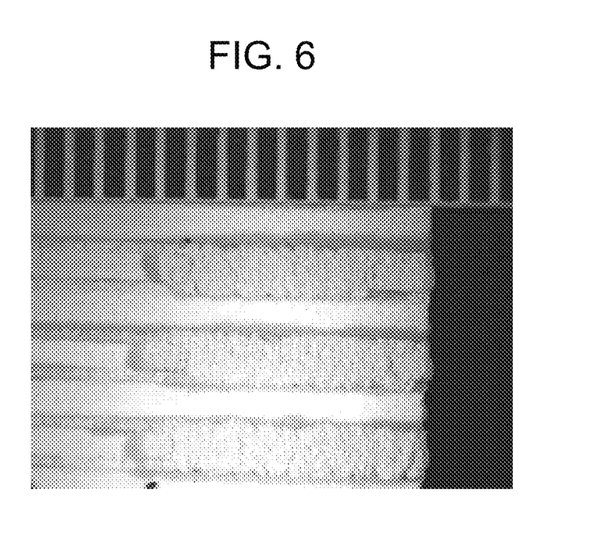
FIG. 6 is a photographic side view image of an aluminum titanate honeycomb substrate end plugged with an inventive plugging mixture according to one embodiment of the present invention.

Further, the inventive plugging mixtures were able to achieve relatively uniform plugging depths in the range of from 5 to 10 mm and resulted in a reduction in surface dimples and void formations. For example, a top and side view of the Aluminum-Titanate substrate plugged with a plugging formulation similar to Example 2 but with no rheology modifier and 1 g less water is shown in FIG. 3 and FIG. 4, respectively. As shown in FIG. 3, the ruler in the top of the photo indicates the existence of approximately 1 mm diameter dimples, 1 mm length voids, or pinholes in the ends of the dried plugs. Similarly, as shown in FIG. 4, the ruler at the side of the photo indicates the existence of 4-5 mm deep dimples and 1 mm spacings or voids, and the results looked similar after firing to 1000° C. In contrast, the top and side view of an aluminum titanate substrate plugged with the inventive plugging mixture of Example 2 is shown in FIG. 5 and FIG. 6, respectively, and the results looked similar after firing to 1000° C. These images indicate that the pinhole holes and dimples illustrated in FIG. 3 and FIG. 4 did not exist when using an inventive plugging mixture comprised of a rheology modifier as described herein.

The plugging mixtures of Examples 25-30 were next evaluated for their use in plugging green honeycomb bodies

TABLE 5

| Example # | Capillary Viscosity (Pa-s) | Inclined Plane | Plug Depth AT (mm) | Dimples in plugged AT* | Plug Depth Cordierite (mm) | Dimples in plugged cordierite* |
|---|---|---|---|---|---|---|
| 1 | 6000 | 0 | 10 | No | NA | NA |
| 2 | 4100 | 0 | 10 | No | NA | NA |
| 3 | 3000 | 0 | 10 | No | 12 | Some |
| 4 | 1500 | 0 | 10 | No | NA | NA |
| 5 | 700 | 23 | 10 | Some | NA | NA |
| 6 | 1500 | 0 | 10 | No | NA | NA |
| 7 | 6000 | 0 | 10 | No | NA | NA |
| 8 | 1800 | 26 | 5 | No | NA | NA |
| 9 | 3200 | 0 | 10 | No | NA | NA |
| 10 | 2100 | 0 | 10 | Some | 12 | Some |
| 11 | 820 | 0 | 10 | No | 12 | Some |
| 12 | 140 | 45 | 10 | No | NA | NA |
| 13 | 2200 | 0 | 10 | Some | NA | NA |
| 14 | 2400 | 0 | 10 | No | NA | NA |
| 15 | 1400 | 0 | 10 | No | NA | NA |
| 16 | 1600 | 0 | 10 | No | NA | NA |
| 17 | 900 | 0 | 10 | No | NA | NA |
| 18 | 550 | 26 | 10 | No | NA | NA |
| 19 | 1300 | 0 | 8 | No | NA | NA |
| 20 | 1200 | 0 | 10 | Some | NA | NA |
| 21 | 1400 | 0 | 8 | No | 5 | NA |
| 22 | 850 | 20 | 10 | No | NA | NA |
| 23 | 2350 | 15 | 7 | No | NA | NA |
| 24 | 2200 | 5 | 7 | No | NA | NA |
| 25 | 3800 | 0 | 10 | No | 7 | no |

*"Some" means some cells dimpled at depths of about 1 mm, but no large internal voids; "No" means no dimples or large internal voids were observed.

The data set forth in Table 5 indicates that the plugging mixtures of Examples 1-25 exhibit several improved rheological properties and performance properties. For example, formed from an unfired cordierite forming ceramic precursor composition. In particular, the green honeycomb bodies were formed from a water plasticized precursor batch composition (which was extruded to form a honeycomb body and then dried) as set forth in Table 6 below:

TABLE 6

| Component | Product Name | Supplier | Supplier Address | Parts by wt. |
|---|---|---|---|---|
| Talc | Luzenac F-Cor | Luzenac | Greenwood Village, CO | 39.5 |
| Silica | Silverbond 200 | Unimim Corp. | New Canaan, CT | 13.5 |
| Alumina | C701 Alumina | Alcan | Chicago, IL | 12 |
| Aluminum Trihydrate | AC400 Aluminum | Aluchem, Inc. | Reading, OH | 16 |
| Clay | K-10 | Imerys | Roswell, GA | 17.2 |
| Starch | Potato Starch | T. J. Harkins | Wood Dale, IL | 10 |
| Organic Binder | Methocel F240 | Dow Chemical | Midland, MI | 4 |
| Crosslinker | Berset 2506/Water | Bercen, Inc. | Cranston, RI | 2.5 |
| Lubricant | Emulsia T/water* | Corning, Inc. | Corning, NY | 8 |
| Organic Binder | Klardaid PC1195 | GE Betz | Trevose, PA | .45 |
| Inorganic Binder | AL-20 SD | Nyacol, Inc. | Ashland, MA | 9 |

*a combination of triethanol amine and tall oil in a 1:1 mole ratio and diluted to 10 wt % in water Using the plasticized batch composition as set forth in TABLE 6, honeycomb bodies were prepared by an extrusion technique having a diameter of approximately 6 inches, a length of approximately 6.5 inches, a cell density of approximately 196 cells per square inch and channel wall thicknesses of approximately 17 mils. The formed green bodies were then dried to at least substantially remove any liquids from the extruded parts. To plug and dry the green honeycomb bodies of Examples 25-30, the procedures used to plug and dry the honeycomb bodies of Examples 1-25 were used. The plugged and dried green honeycomb bodies were then evaluated for the plugging depth and the existence of dimple formation. The results of this evaluation are set forth in TABLE 7 below:

TABLE 7

| Example # | Capillary Viscosity (Pa-s) | Plug Depth in Green Body (mm) | Dimple Formation |
|---|---|---|---|
| 25 | 3800 | 11 | None |
| 26 | 550 | 10 | None |
| 27 | 500 | 10 | None |
| 28 | 1400 | 12 | None |
| 29 | 2050 | 10 | Slight |
| 30 | 7800 | 10 | None |

The data set forth in Table 7 again illustrates that the inventive compositions of the present invention can exhibit several improved performance properties, and even when used as plugging mixtures for plugging green unfired honeycomb bodies. In particular, Table 7 indicates that uniform plugging depths of at least 10 mm were again achieved without any significant formation of dimples during the drying process.

Lastly, it should also be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. A method for manufacturing a porous ceramic wall flow filter, comprising the steps of:
providing an already fired ceramic honeycomb structure defining a plurality of cell channels bounded by porous channel walls that extend longitudinally from an upstream inlet end to a downstream outlet end;
selectively plugging an end of at least one predetermined channel with a plugging mixture which exhibits a capillary viscosity less than 8000 Pa-s when measured at a shear rate of 10/sec to form a honeycomb body; and
heating the end plugged honeycomb body at a temperature of at least 50° C. for a period of time sufficient to at least substantially remove the liquid vehicle from the plugging mixture; and then
firing the selectively plugged honeycomb body to a peak plug firing temperature of at least 400° C., the peak plug firing temperature being lower than a peak firing temperature of the already fired ceramic honeycomb structure, effective to set or cure the plugging material in the at least one selectively plugged channel;
wherein the plugging mixture also exhibits an inclined plane flow rate less than 60mm/8min when measured at an angle of 60 degrees; and
wherein the plugging mixture comprises: an inorganic batch composition; a binder; a liquid vehicle; and a rheology modifier selected from the group consisting of an oil, a non-ionic surfactant, and combinations thereof; and
wherein the rheology modifer comprises a polyethylene glycol 200 dioleate.

2. The method of claim 1, wherein the rheology modifier comprises an oil.

3. The method of claim 1, wherein the rheology modifier comprises peanut oil, soybean oil, or vegetable oil.

4. The method of claim 1, wherein the inorganic batch composition comprises cordierite.

5. The method of claim 4, wherein the cordierite comprises a blend of a first powdered cordierite having a median particle size in the range of from 35 µm to 45 µm and a second powdered cordierite having a median particle size in the range of from 10 µm to 20 µm.

6. The method of claim 4, wherein the inorganic batch further comprises a borosilicate glass.

7. The method of claim 1, wherein the binder component comprises colloidal silica, colloidal alumina, or a combination thereof.

8. The method of claim 1, wherein the inorganic batch composition is an aluminum titanate forming batch composition, comprising an alumina source, a silica source, and a titania source.

9. The method of claim 1, wherein the inorganic batch composition is a cordierite forming batch composition, comprising a magnesium oxide source; an alumina source; and a silica source.

10. The method of claim 1, wherein the rheology modifier is present as a super addition in an amount in the range of from 0.1 weight percent to 15 weight percent relative to the inorganic batch composition.

11. The method of claim 1 wherein the firing results in the formation of a sintered phase ceramic plug in the at least one selectively plugged channel.

12. The method of claim 1 wherein the plugging material has a depth of 5 to 10 mm.

13. A method for manufacturing a porous ceramic wall flow filter, comprising the steps of:
provliding an already fired ceramic honeycomb structure defining a plurality of cell channels bounded by porous channel walls that extend longitudinally from an upstream inlet end to a downstream outlet end;
selectively plugging an end of at least one predetermined channel with a plugging mixture which exhibits a capillary viscosity less than 8000 Pa·s when measured at a shear rate of 10/sec to form a honeycomb body; and
heating the end plugged honeycomb body at a temperature of at least 50° C. for a period of time sufficient to at least substantially remove the liquid vehicle from the plugging mixture; and then
firing the selectively plugged honeycomb body to a peak plug firing temperature of at least 400° C., the peak plug firing temperature being lower than a peak firing temperature of the already fired ceramic honeycomb structure, effective to set or cure the plugging material in the at least one selectively plugged channel;
wherein the plugging mixture also exhibits an inclined plane flow rate less than 60mm/8min when measured at an angle of 60 degrees; and
wherein the plugging mixture comprises: an inorganic batch composition; a binder; a liquid vehicle; and a rheology modifier comprising a polyethylene glycol 200 dioleate.

14. The method of claim 13, wherein the inorganic batch composition comprises cordierite.

15. The method of claim 14, wherein the cordierite comprises a blend of a first powdered cordierite having a median particle size in the range of from 35 µm to 45 µm and a second powdered cordierite having a median particle size in the range of from 10 µm to 20 µm.

16. A method for manufacturing a porous ceramic wall flow filter, comprising the steps of:
providing an already fired ceramic honeycomb structure defining a plurality of cell channels bounded by porous channel walls that extend longitudinally from an upstream inlet end to a downstream outlet end;
selectively plugging an end of at least one predetermined channel with a plugging mixture which exhibits a capillary viscosity less than 8000 Pa·s when measured at a shear rate of 10/sec to form a honeycomb body; and
heating the end plugged honeycomb body at a temperature of at least 50° C. for a period of time sufficient to at least substantially remove the liquid vehicle from the plugging mixture; and then
firing the selectively plugged honeycomb body to a peak plug firing temperature of at least 400° C., the peak plug firing temperature being lower than a peak firing temperature of the already fired ceramic honeycomb structure, effective to set or cure the plugging material in the at least one selectively plugged channel;
wherein the plugging mixture also exhibits an inclined plane flow rate less than 60mm/8min when measured at an angle of 60 degrees; and
wherein the plugging mixture comprises: an inorganic batch composition; a binder; a liquid vehicle; and a rheology modifier selected from the group consisting of an oil, a non-ionic surfactant, and combinations thereof, wherein the inorganic batch composition comprises cordierite comprising a blend of a first powdered cordierite having a median particle size in the range of from 35 µm to 45 µm and a second powdered cordierite having a median particle size in the range of from 10 µm to 20 µm; and wherein the rheology modifier comprises a polyethylene glycol 200 dioleate.

17. The method of claim 16, wherein the rheology modifier comprises an oil.

* * * * *